United States Patent
Hacker et al.

(10) Patent No.: US 11,233,287 B2
(45) Date of Patent: Jan. 25, 2022

(54) NON-PROPAGATING MODULAR AND SCALABLE LITHIUM ION BATTERY

(71) Applicant: The United States of America, as represented by the Secretary of the Navy, Crane, IN (US)

(72) Inventors: Christopher D Hacker, Bloomington, IN (US); Tyler James Wagler, Loogootee, IN (US); Zachary P. Steffes, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/414,431

(22) Filed: May 16, 2019

(65) Prior Publication Data

US 2019/0355941 A1  Nov. 21, 2019

Related U.S. Application Data

(60) Provisional application No. 62/672,117, filed on May 16, 2018.

(51) Int. Cl.
*H01M 50/20* (2021.01)
*H01M 50/10* (2021.01)
*H01M 10/0525* (2010.01)
*H01M 50/572* (2021.01)

(52) U.S. Cl.
CPC ....... *H01M 50/10* (2021.01); *H01M 10/0525* (2013.01); *H01M 50/20* (2021.01); *H01M 50/572* (2021.01)

(58) Field of Classification Search
CPC .... H01M 50/10; H01M 50/20; H01M 50/572; H01M 10/0525
See application file for complete search history.

(56) References Cited

U.S. PATENT DOCUMENTS

| 2004/0229112 | A1* | 11/2004 | Sharrow | ................ | H01M 6/44 429/97 |
| 2010/0136405 | A1* | 6/2010 | Johnson | .............. | H01M 10/656 429/120 |
| 2018/0261804 | A1 | 9/2018 | Bayles et al. | | |

* cited by examiner

*Primary Examiner* — Milton I Cano
*Assistant Examiner* — Jenna Shulman
(74) *Attorney, Agent, or Firm* — Naval Surface Warfare Center, Crane Division

(57) ABSTRACT

The present invention relates to a modular lithium-ion battery system that can be scaled vertically and horizontally. A plurality of cell modules can combined to form stacks and layers. Each cell module has a cell body housing a plurality of battery cells. Each cell module has a positive fuse plate and a negative fuse plate connected to opposing sides of the plurality of battery cells.

2 Claims, 15 Drawing Sheets

Module - Vertical Exploded View

Module - Vertical Exploded View

37 Cells-Hexagon

Round Housing Efficiency

259 Cells

Module - Vertical Bottom View

Module - Horizontal Top View

Module - Horizontal Bottom View

NON-PROPAGATING MODULAR AND SCALABLE LITHIUM ION BATTERY

CROSS-REFERENCE TO RELATED APPLICATIONS

This patent application claims the benefit of U.S. Provisional Application No. 62/672,117, titled "NON-PROPAGATING MODULAR AND SCALABLE LITHIUM ION BATTERY", filed Jun. 16, 2018, the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,509) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to a modular lithium-ion battery system.

BACKGROUND AND SUMMARY OF THE INVENTION

The present invention relates to a modular lithium-ion (Li-ion) battery system. Single Li-ion batteries have limited utility due to the limitations of using a single battery. To compensate, multiple Li-ion batteries can be incorporated into a battery system. Large scale traditional Li-ion battery systems pose a risk to users, equipment and facilities, especially in the event of misuse or damage. Individual cell failure modes can lead to energetic cell responses, including fires. Cell failure can propagate from cell to cell throughout a battery assembly to create a chain reaction of responses. What is needed is a non-propagating Li-ion Battery system that is modular and scalable for a wide range of applications.

According to an illustrative embodiment of the present disclosure, a Li-ion battery system comprises a plurality of Li-ion batteries cells in a modular and scalable system that is horizontally (e.g., a plurality of batteries arranged within a layer) and vertically configurable (e.g., at least one layer of batteries) such that an individual failure in one battery does not spread to other batteries. Cells can be placed in cell modules in a variety of patterns (e.g., hexagonal, triangular, square) and numbers (e.g., 37 cells, 9 cells, 6 cells) based on the operational needs (e.g., power requirements, space limitations) of the battery system. Cell module can be placed in a battery housing in a variety of packing arrangements depending on the shape of each According to a further illustrative embodiment of the present disclosure, an individual battery module can include power/signal connectors, a battery management PCB, a thermal barrier, a standoff isolator (e.g., mica), a terminal isolator (e.g., mica), a cell isolater (e.g., mica), a positive fuse plate (e.g., nickel), heat rejection material (e.g., syntactic foam), a cell retaining clip, a negative fuse plate (e.g., nickel), a thermally conductive pad, and a heat spreader (e.g., aluminum).

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
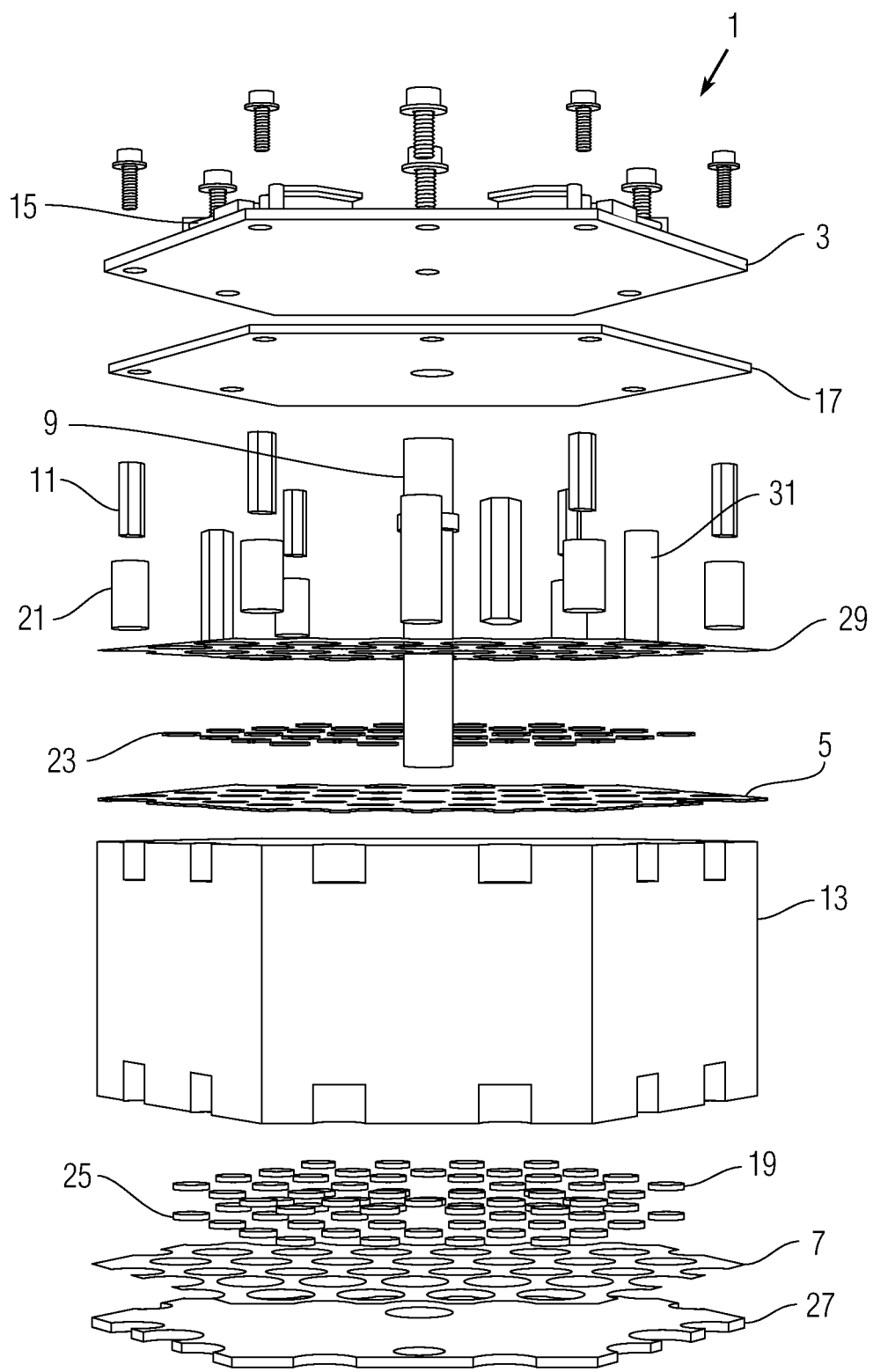
FIG. 1 shows an exploded view of an exemplary cell module.

FIG. 1 shows an exploded view of an exemplary cell module 1. A printed circuit board (PCB) 3 can be used for battery management. A positive fuse plate 5 (e.g., nickel) is placed above a plurality of battery cells (not shown) and a negative fuse plate 7 (e.g., nickel) is placed below the plurality of battery cells. A negative terminal 9 (e.g., copper) can be passed through the center of the cell module 1. Each standoff section comprises a positive terminal standoff 11 disposed within a standoff isolator 21, wherein each positive terminal standoff 11 comprises a conductive material and each standoff isolator comprises 21 a nonconductive material. Positive terminal standoffs 11 (e.g., brass) separate PCB 3 and positive fuse plate 5. Cell body 13 is formed with a plurality of apertures that conform to the plurality of battery cells. Cell body 13 can be a syntactic foam made of a heat rejection material to mitigate heat transfer between cells. Power/signal connectors 15 coupled to PCB 3 allow a cell module to couple with other cell modules or external devices. A thermal barrier 17 (e.g., a fiber reinforced ceramic laminate) can be placed below PCB 3 to protect PCB 3 from heat damage. A cell retaining clip 19 can be coupled to the bottom of each battery cell to keep the plurality of battery cells in place during movement or assembly of the cell modules. Standoff isolators 21 (e.g., mica) can be placed between PCB 3 and positive fuse plate 5. A terminal isolator 23 can be placed above positive fuse plate 5. Thermally conductive pads 25 can be placed on each battery cell to transfer heat away from the battery cells. A heat spreader 27 (e.g., an aluminum plate) can be coupled to bottom of cell module 1 to help dissipate heat away from cell module 1. A cell isolator 29 (e.g., a mica sheet) can be placed above positive fuse plate 5, however, cell isolator 29 can direct particulate to adjacent cells after a cell failure, causing increased abuse to other cells and increasing the chance of failure propagation. Vertical mounting standoffs 31 can be anchor pressed into cell body 13 and coupled to an additional cell module (not shown) above cell module 1.

Figure 2:
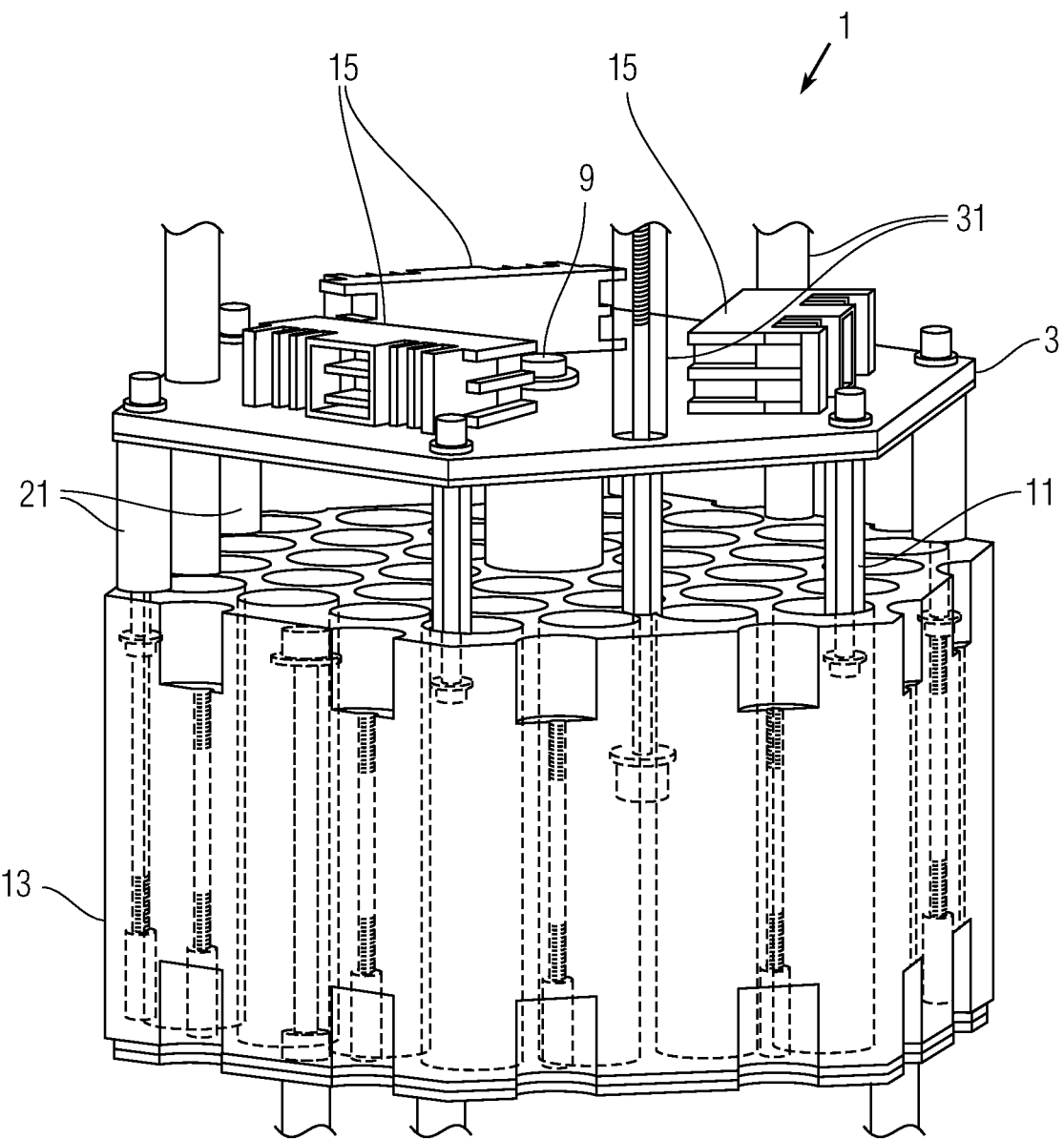
FIG. 2 shows an assembled view of an exemplary cell module.

FIG. 2 shows an assembled view of an exemplary cell module 1.

Figure 3:
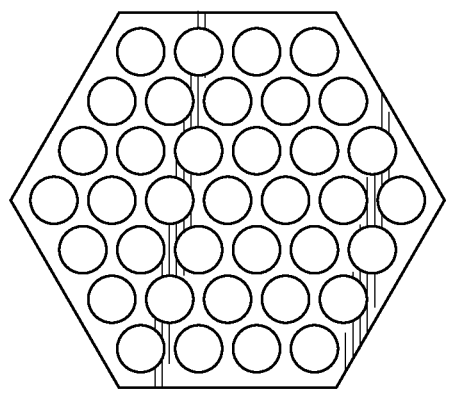
FIG. 3 shows simplified views of an exemplary cell module including a view of a cell packing arrangement.
Figure 3:
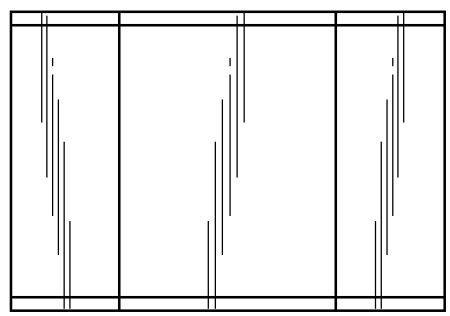
Figure 3:
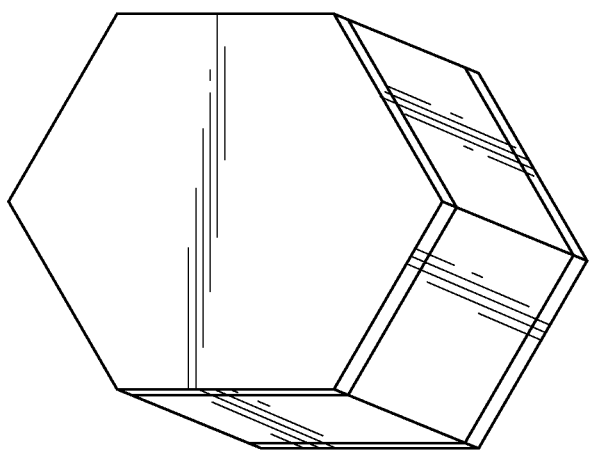
Figure 3:
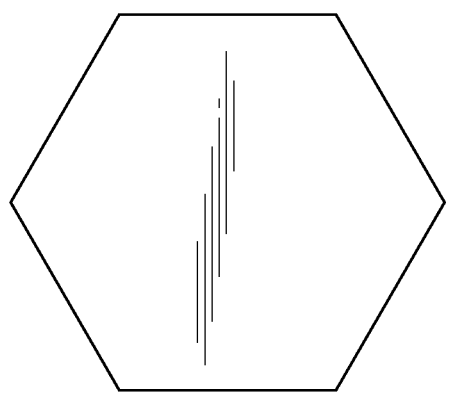

FIG. 3 shows simplified views of an exemplary cell module 1 including a view of a cell packing arrangement. The hexagonal arrangement shown allows for an efficient packing density of battery cells while also allowing easy horizontal scaling of cell modules (e.g., as shown in FIGS. 16 and 17).

Figure 4:
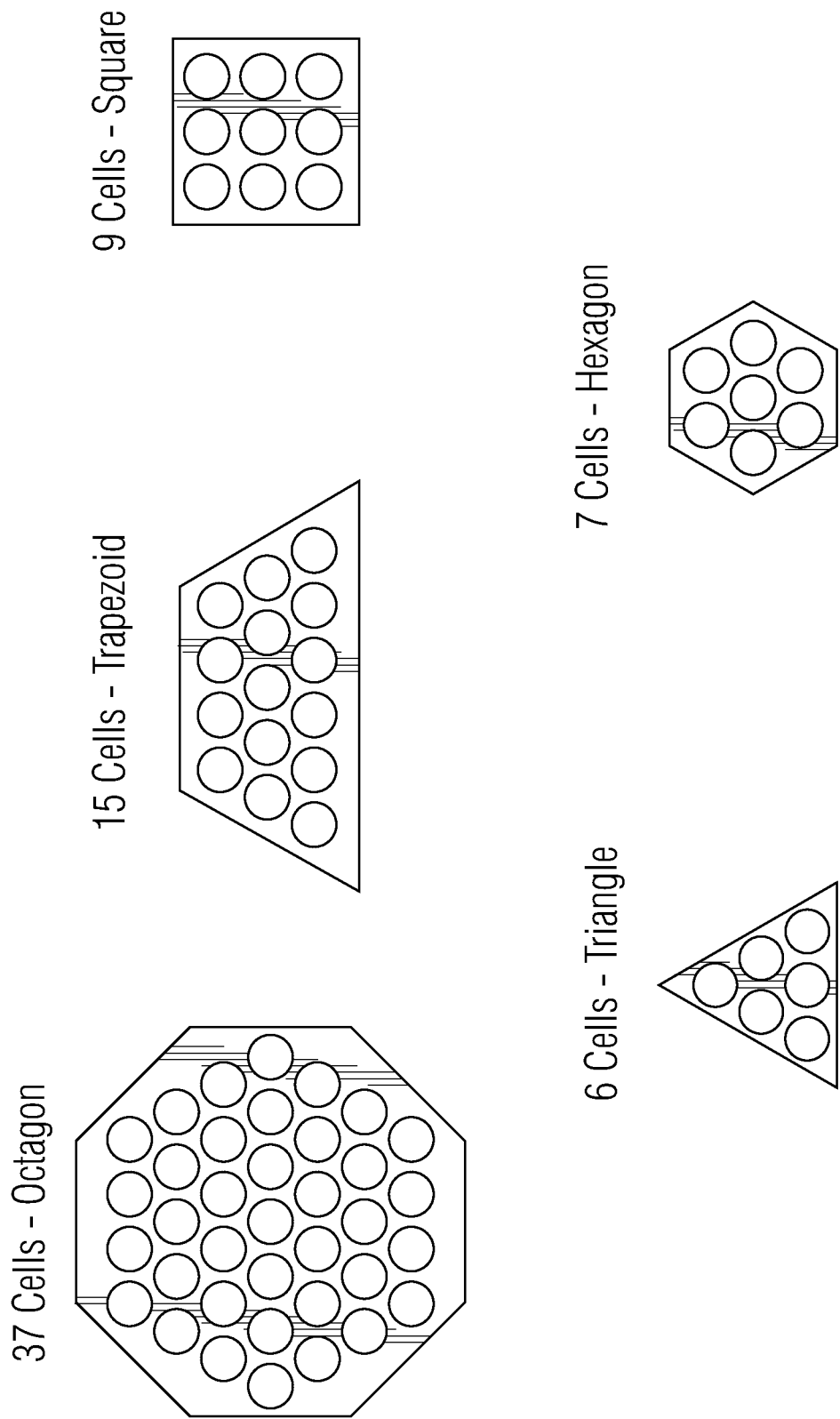
FIG. 4 shows additional cell packing arrangements.

FIG. 4 shows additional cell packing arrangements.

Figure 5:
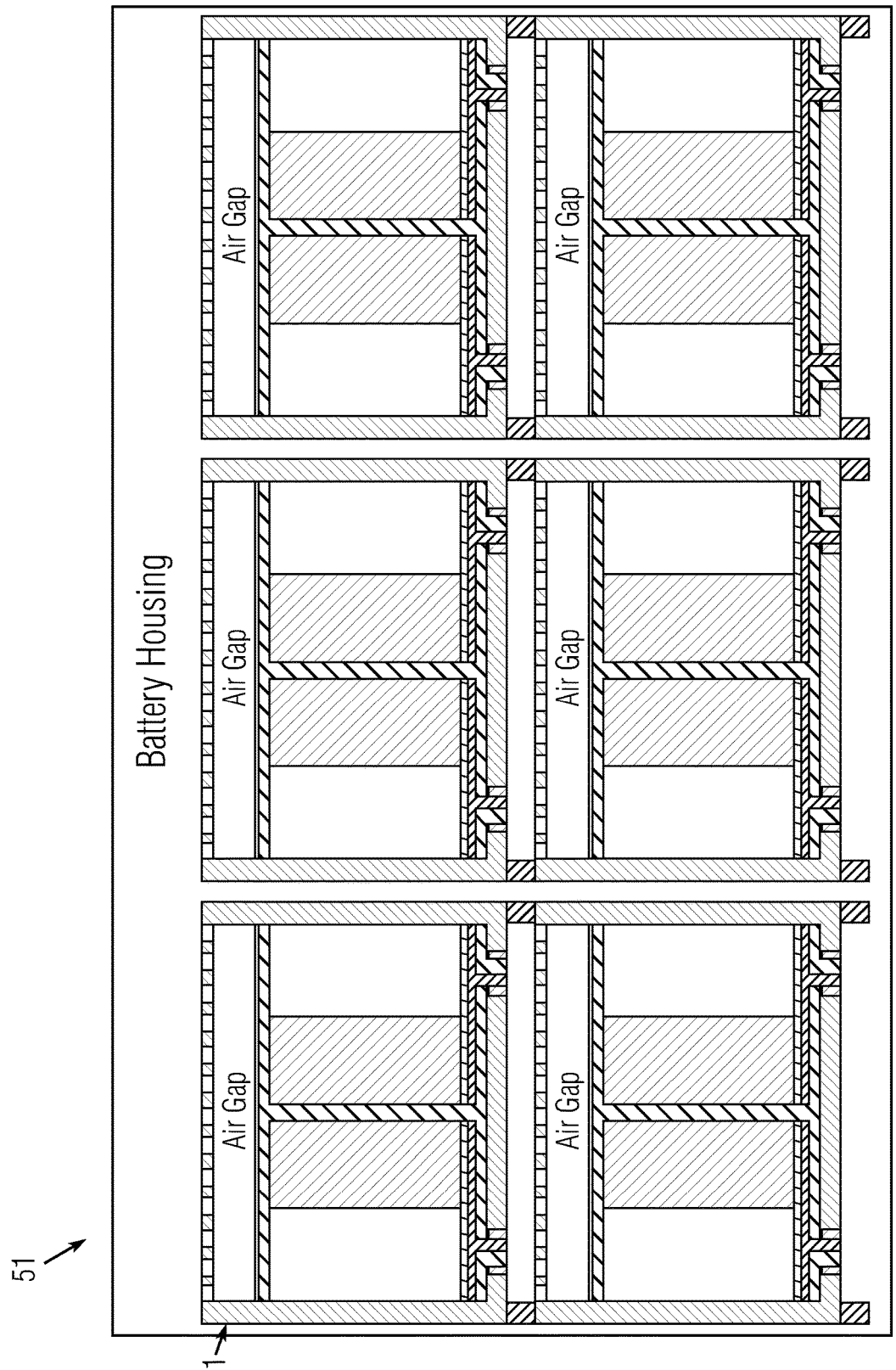
FIG. 5 shows a side view of a battery housing with multiple housing modules.

FIG. 5 shows a side view of a battery housing 51 with multiple cell modules 1.

Figure 6:
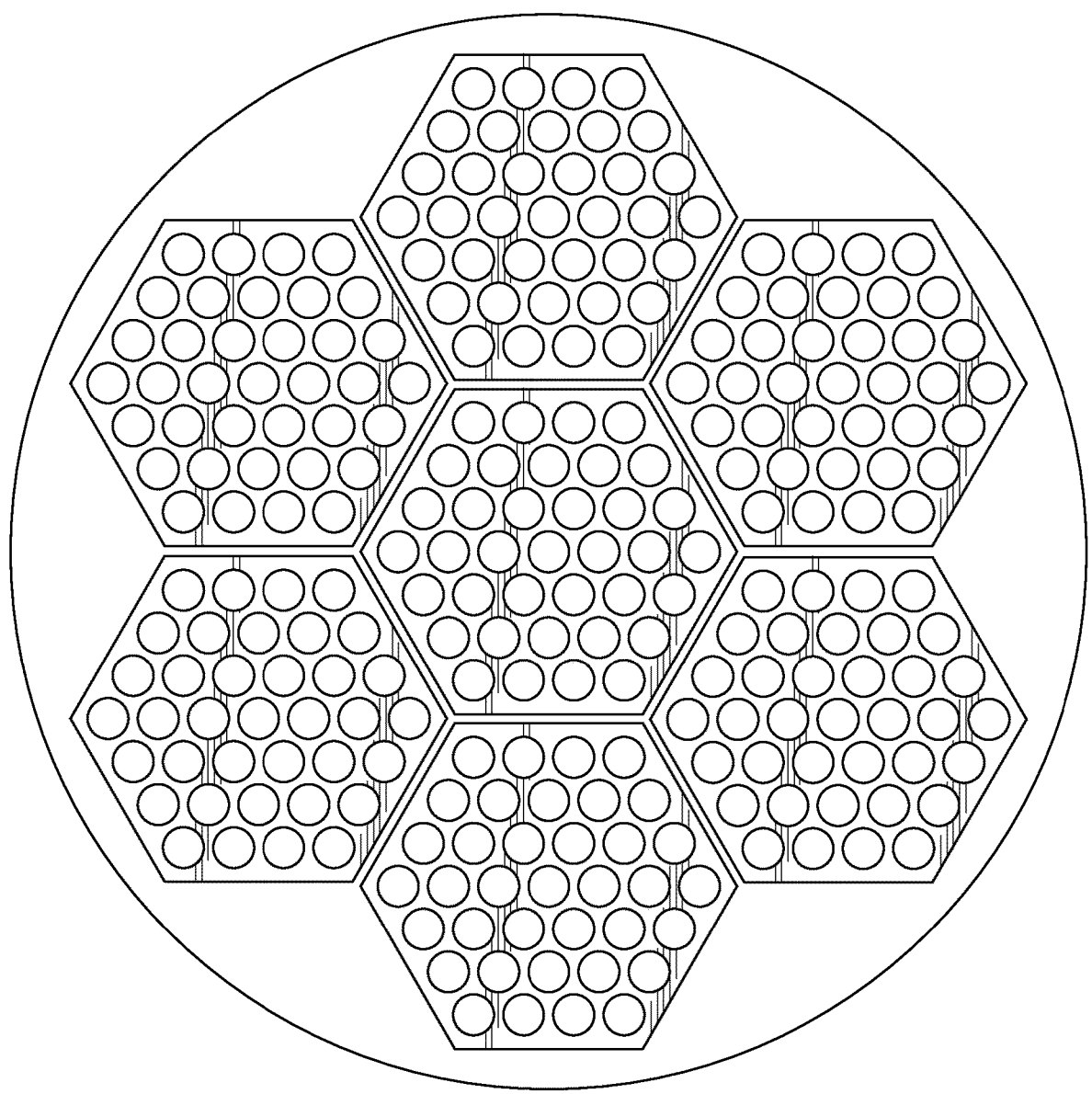
FIG. 6 shows an exemplary battery housing packing arrangement.

FIG. 6 shows an exemplary battery housing packing arrangement.

Figure 7:
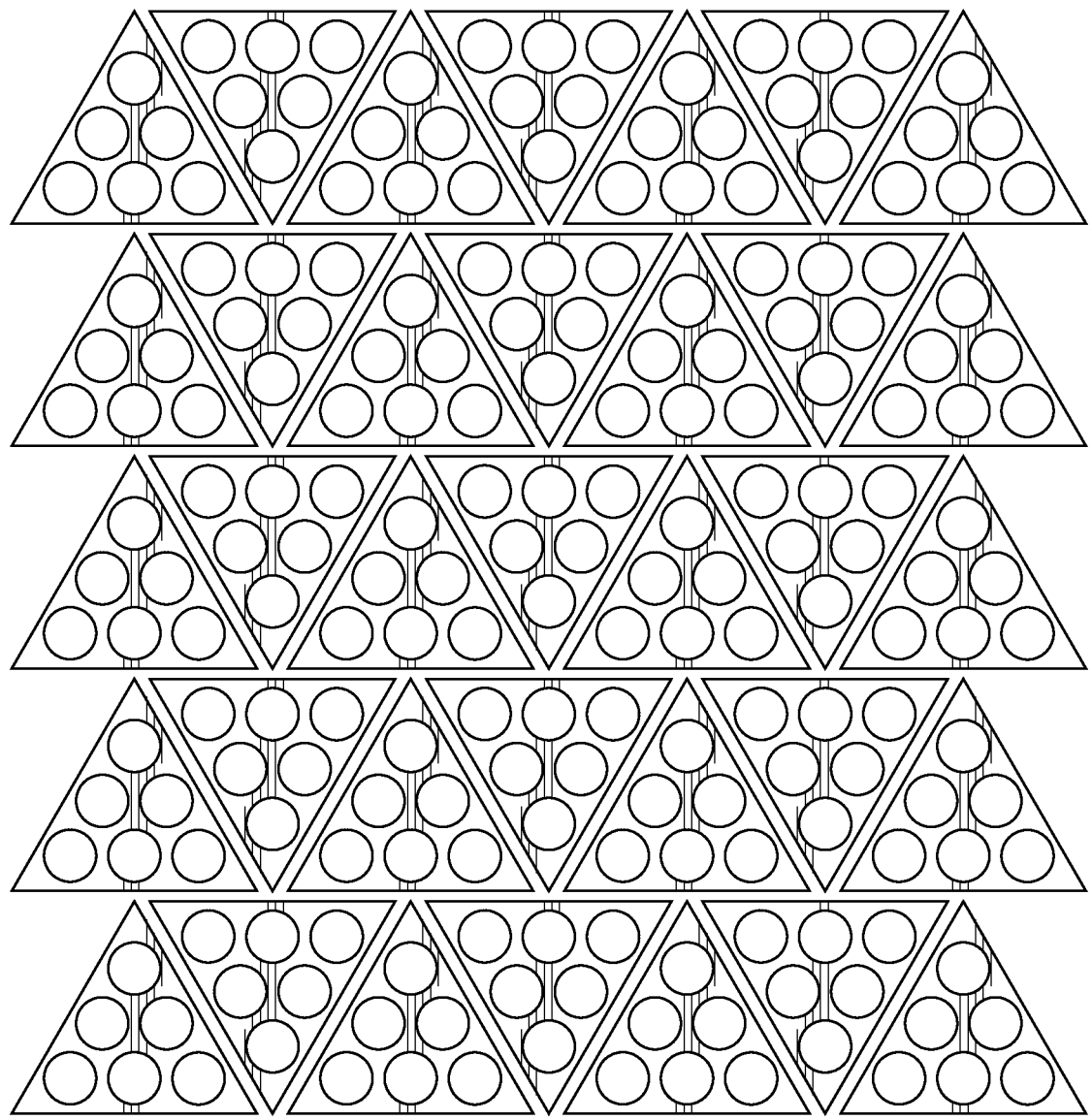
FIG. 7 shows an exemplary battery housing packing arrangement.

FIG. 7 shows an exemplary battery housing packing arrangement.

Figure 8:
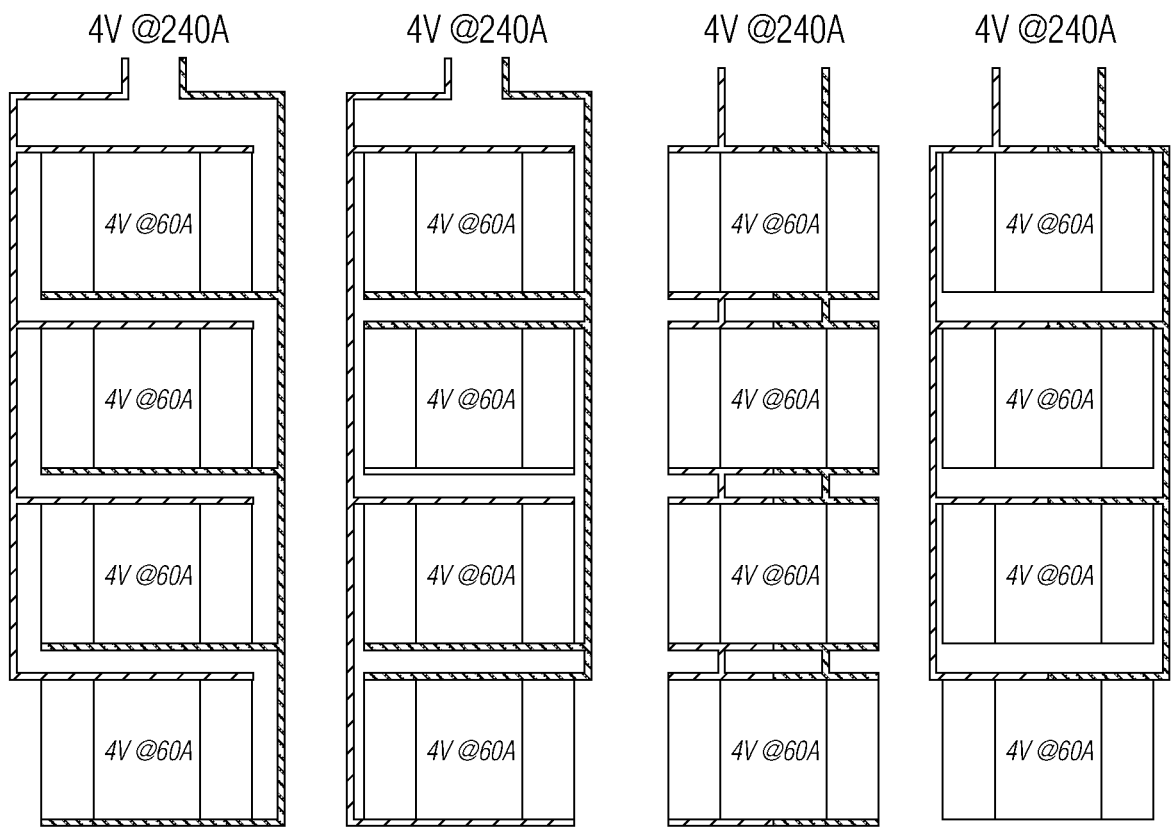
FIG. 8 shows an exemplary vertical battery arrangement with parallel connections.

FIG. 8 shows an exemplary vertical battery arrangement with parallel connections.

Figure 9:
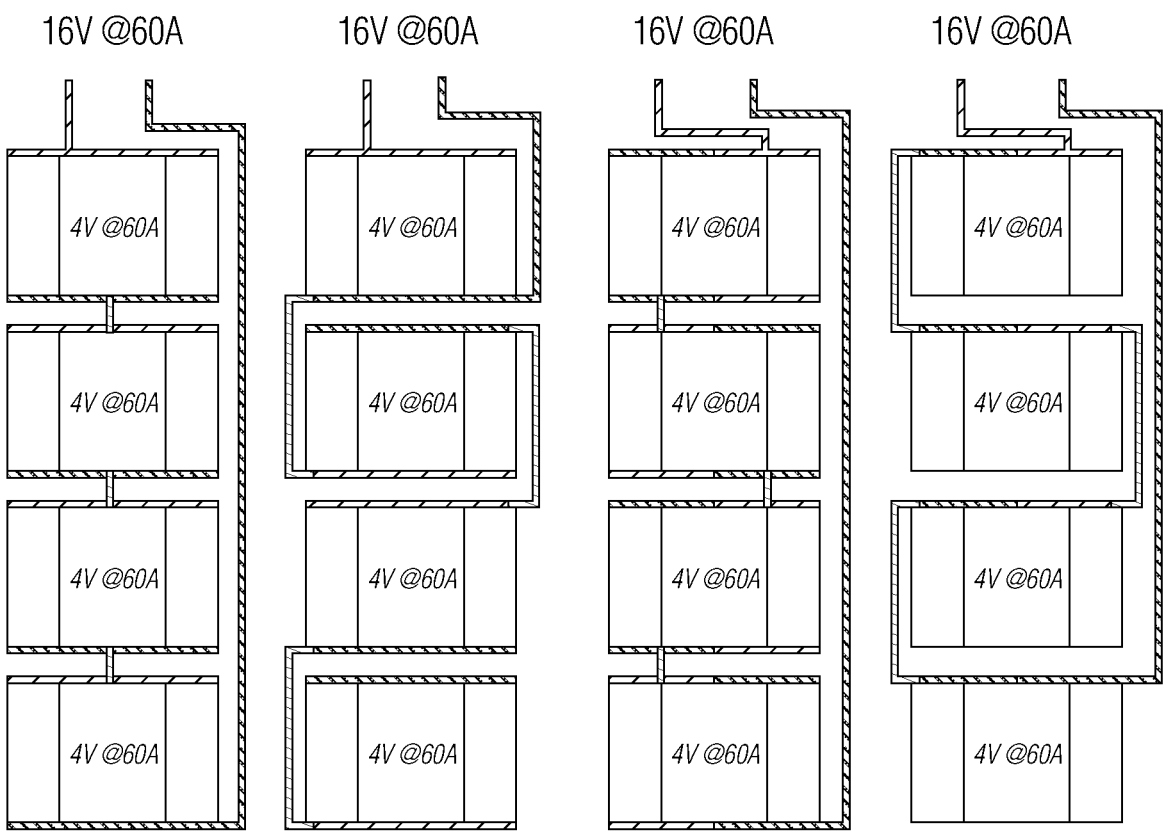
FIG. 9 shows an exemplary vertical battery arrangement with serial connections.

FIG. 9 shows an exemplary vertical battery arrangement with serial connections.

Figure 10:
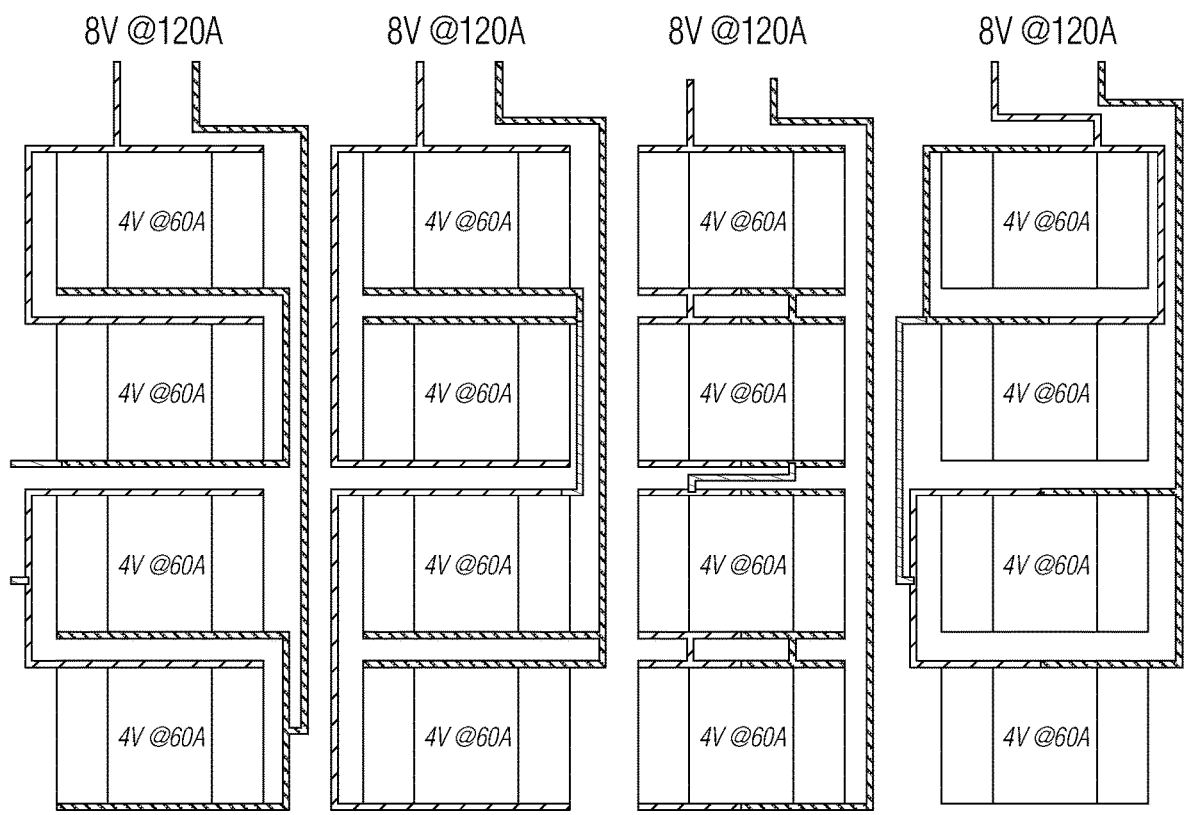
FIG. 10 shows an exemplary vertical battery arrangement with serial and parallel connections.

FIG. 10 shows an exemplary vertical battery arrangement with serial and parallel connections.

Figure 11:
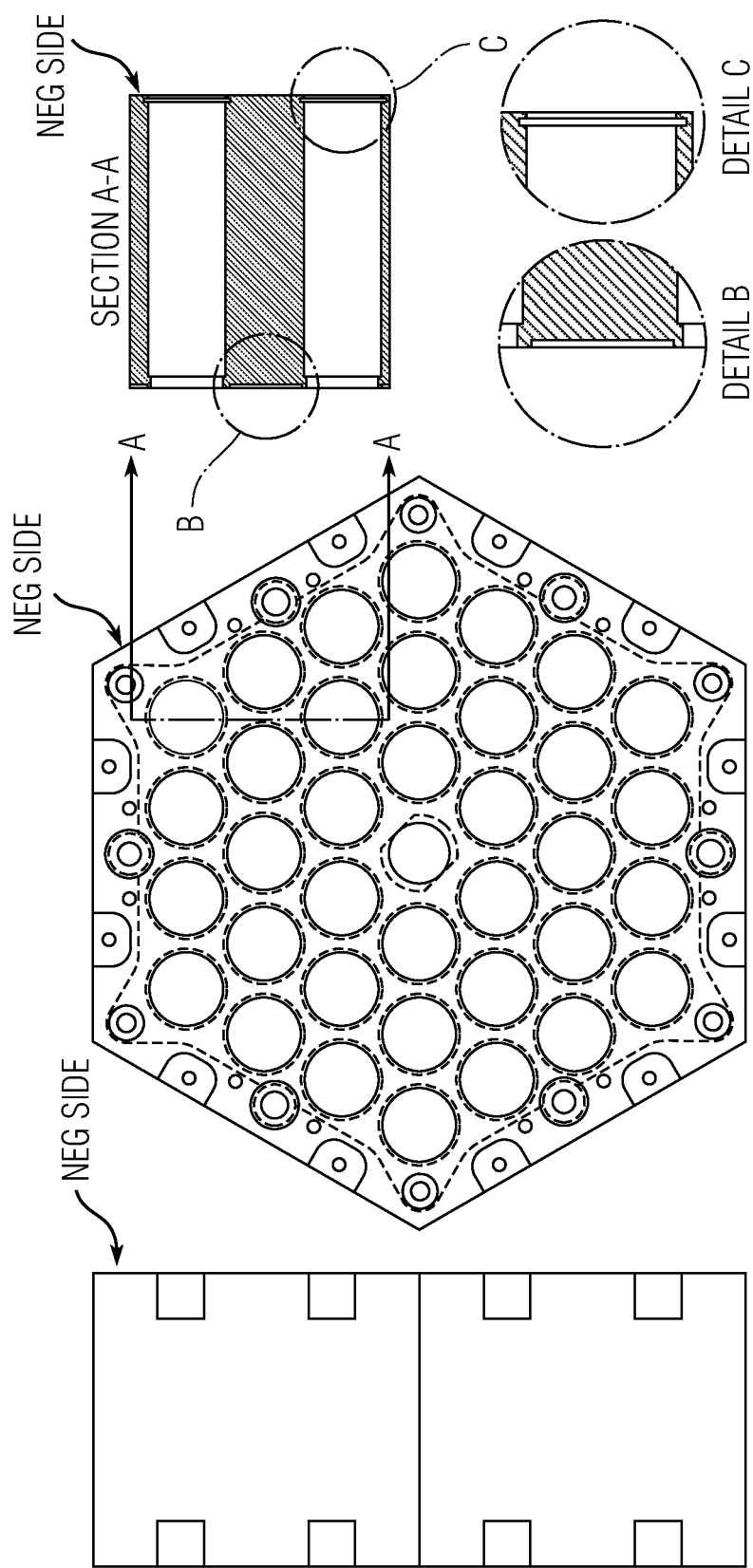
FIG. 11 shows cross sectional profile views of an exemplary cell module.

FIG. 11 shows cross sectional profile views of an exemplary cell module.

Figure 12:
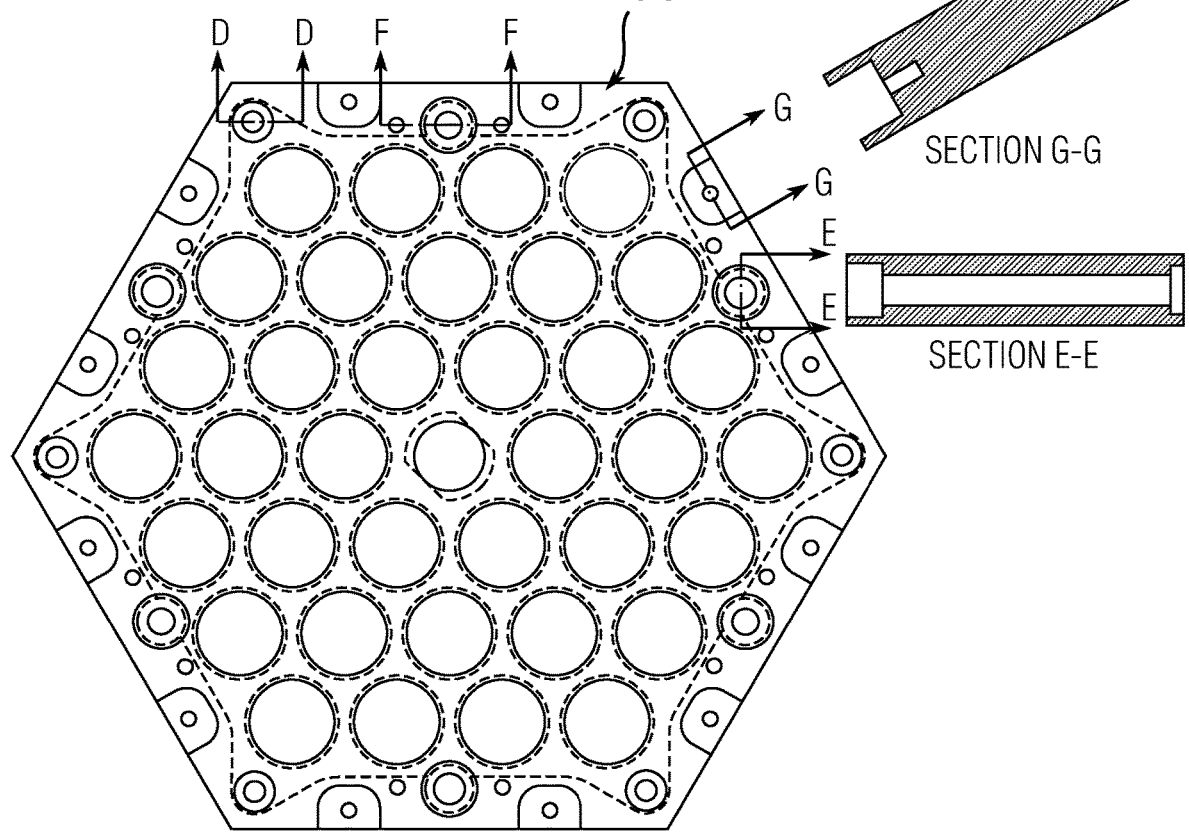
FIG. 12 shows cross sectional profile views of an exemplary cell module.

FIG. 12 shows cross sectional profile views of an exemplary cell module.

Figure 13:
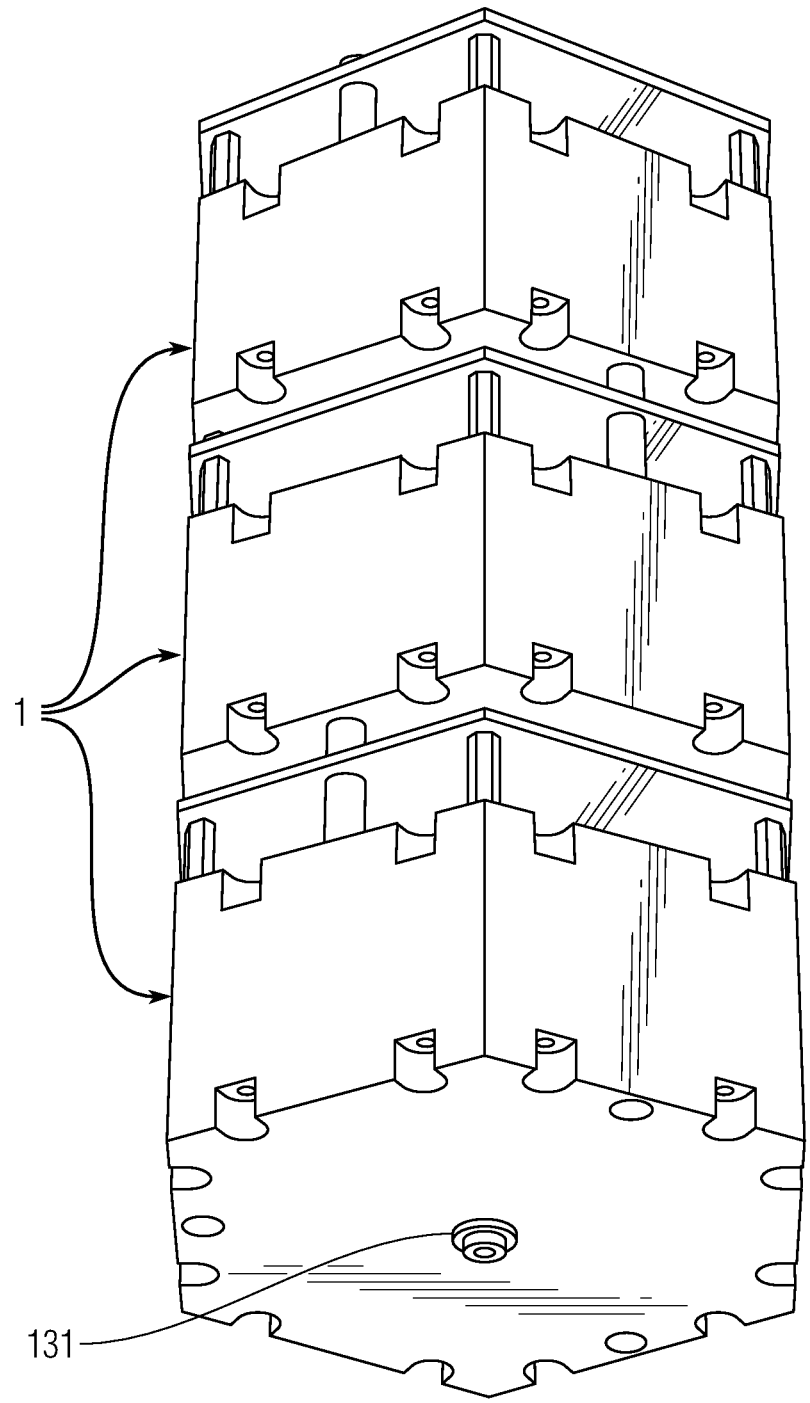
FIG. 13 shows a bottom isometric view of an exemplary vertical cell module stack.

FIG. 13 shows a bottom isometric view of an exemplary vertical cell module stack. Cell modules 1 can be vertically stacked. Each cell module 1 can have a negative terminal mounting bolt 131 hold the cell module 1 together. In some embodiments, a single negative terminal mounting bolt 131 runs through each cell module 1 in a stack.

Figure 14:
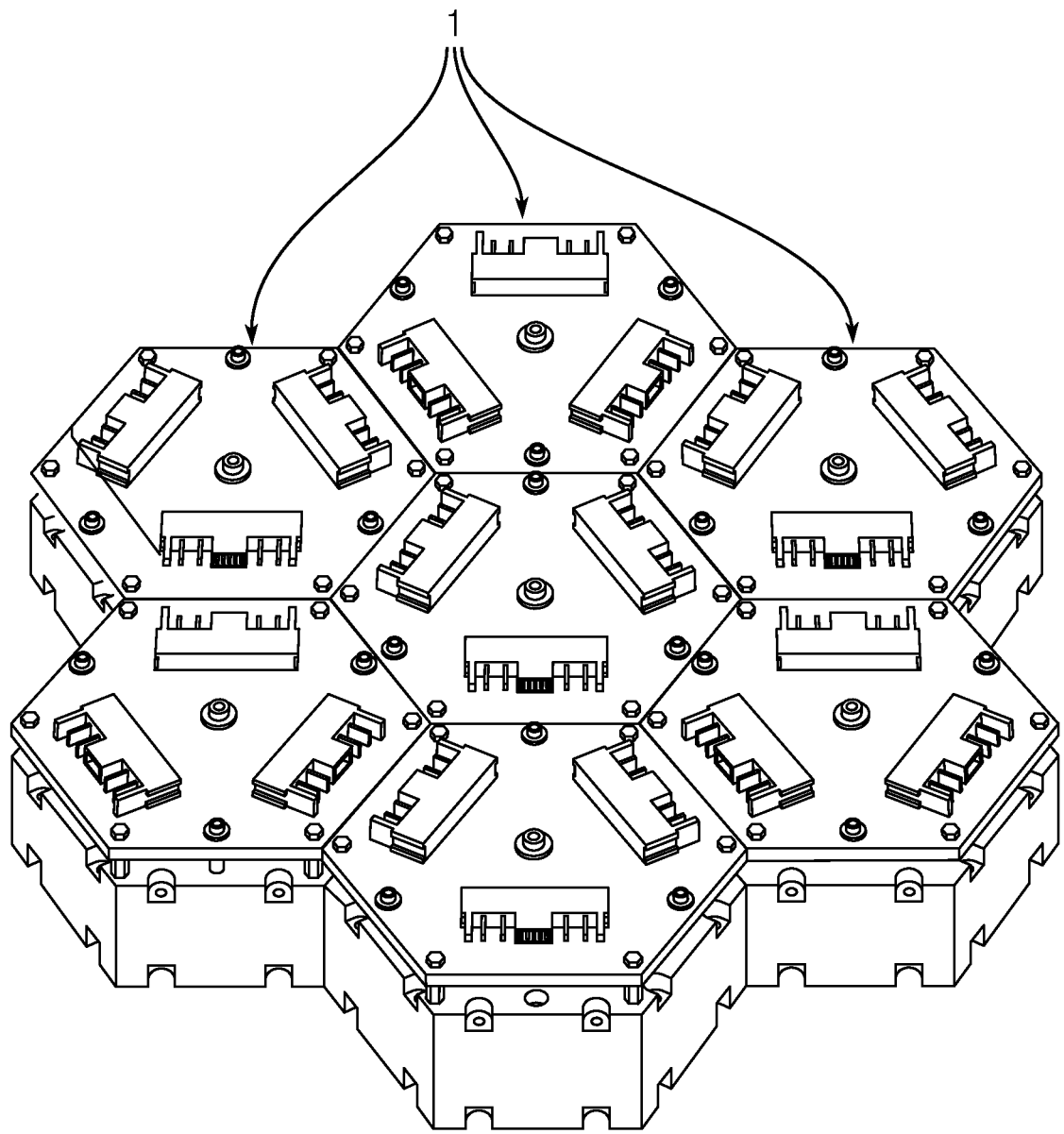
FIG. 14 shows a top isometric view of an exemplary horizontal cell module layer.

FIG. 14 shows a top isometric view of an exemplary horizontal cell module layer.

Figure 15:
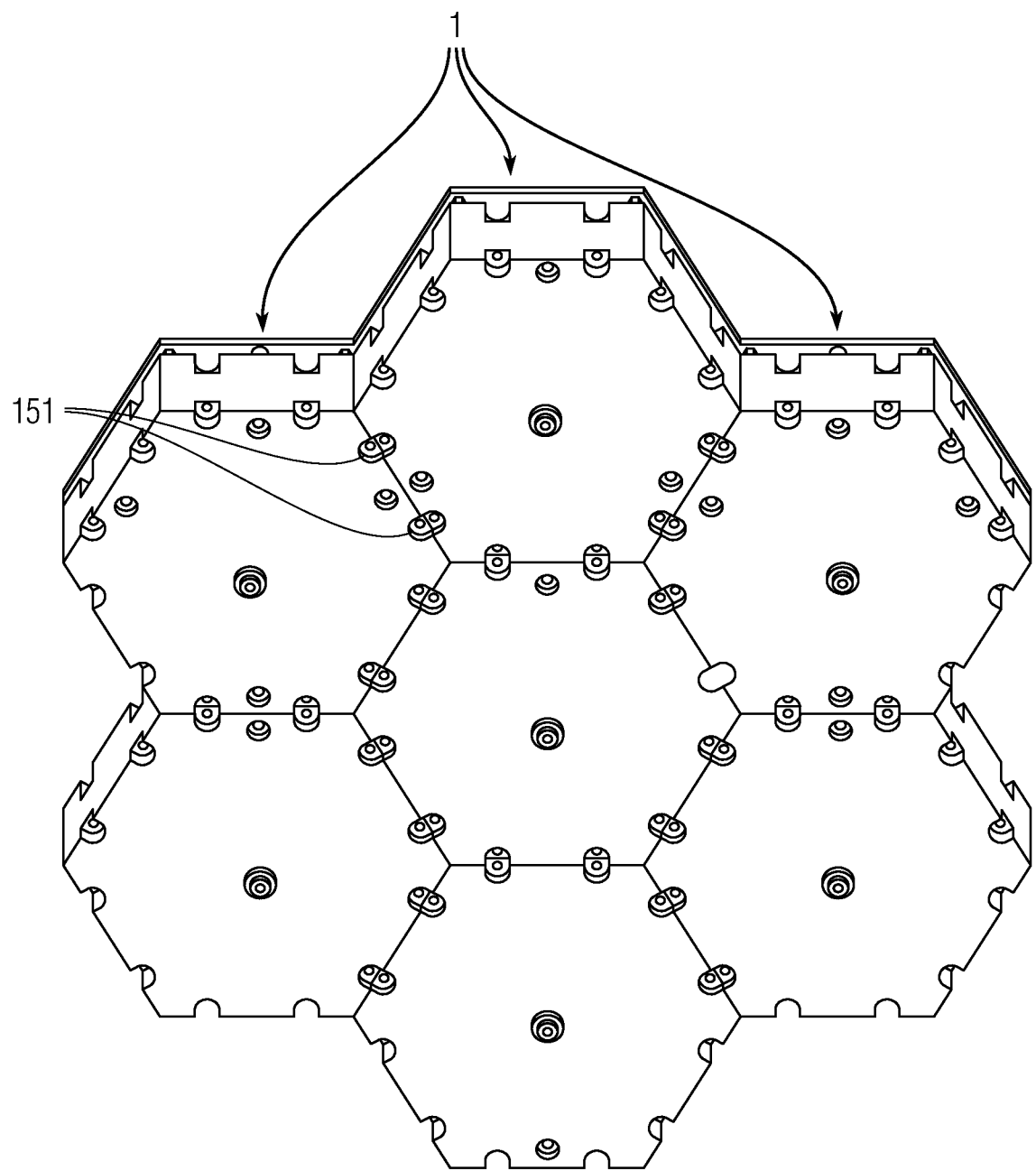
FIG. 15 shows a bottom isometric view of an exemplary horizontal cell module layer.

FIG. 15 shows a bottom isometric view of an exemplary horizontal cell module layer. A plurality of horizontal mounting bars 151 couple each cell module 1 to each adjacent cell module 1.

Although the invention has been described in detail with reference to certain preferred embodiments, variations and modifications exist within the spirit and scope of the invention as described and defined in the following claims.

The invention claimed is:

1. A modular lithium-ion battery system comprising:
   at least one cell module comprising:
      a plurality of battery cells;
      a cell body formed with a plurality of apertures such that each battery cell of the plurality of battery cells fits into a aperture of the plurality of apertures;
      a printed circuit board (PCB);
      a positive fuse plate disposed above the cell body such that each battery cell touches the positive fuse plate;
      a negative fuse plate disposed below the cell body such that each battery cell touches the negative fuse plate;
      a negative terminal rod coupled to the PCB, the positive fuse plate, and the negative fuse plate;
      a plurality of standoff sections separating the PCB and the positive fuse plate;
   wherein each standoff section of the plurality of standoff sections comprises a positive terminal standoff disposed within a standoff isolator, wherein each positive terminal standoff comprises a conductive material and each standoff isolator comprises a nonconductive material.

2. The system of claim 1 further comprising a first thermal barrier disposed between the positive fuse plate and the PCB.

* * * * *